United States Patent [19]

Smith

[11] Patent Number: 4,462,785

[45] Date of Patent: * Jul. 31, 1984

[54] FORMING APPARATUS

[75] Inventor: Carl M. Smith, Oakville, Canada

[73] Assignee: Allen Industries, Inc., Troy, Mich.

[*] Notice: The portion of the term of this patent subsequent to Apr. 5, 2000 has been disclaimed.

[21] Appl. No.: 463,218

[22] Filed: Feb. 2, 1983

Related U.S. Application Data

[60] Division of Ser. No. 313,106, Oct. 20, 1981, Pat. No. 4,379,101, which is a continuation of Ser. No. 156,437, Jun. 4, 1980, abandoned.

[51] Int. Cl.[3] ........ B29J 5/00

[52] U.S. Cl. ........ 425/387.1; 425/407

[58] Field of Search ........ 156/62.2, 308.8, 307.1, 156/499, 285; 264/109, 101, 119, 552, 319, 320, 83, 82, 123, 40.3; 425/387.1, 406, 508, 407; 34/145, 46, 47, 50, 76, 48

[56] References Cited

U.S. PATENT DOCUMENTS

| | | | |
|---|---|---|---|
| 3,280,237 | 10/1966 | Corbin et al. | 264/109 |
| 3,739,496 | 6/1973 | Buckley et al. | 34/210 |
| 3,891,738 | 6/1975 | Shen | 264/101 |
| 3,992,238 | 11/1976 | Johns | 156/285 |
| 4,029,461 | 6/1977 | Lacon | 156/498 |
| 4,115,498 | 9/1978 | Kissell | 264/119 |
| 4,162,877 | 7/1979 | Nyberg et al. | 425/406 |

*Primary Examiner*—Michael W. Ball
*Attorney, Agent, or Firm*—Joseph V. Tassone

[57] ABSTRACT

An apparatus and method are disclosed for forming a fibrous workpiece comprised of a layer of randomly disposed fibers and adhesive material dispersed throughout the fibers for binding same upon heating and compressing the fibers and adhesive material to define a unitary pad wherein the apparatus comprises a press having a first and a second platen supported for relative movement toward and away from each other, a first and a second mold supported by the first and second platens respectively with the molds having forming surfaces which define the configuration of the pad, and means for heating the workpiece wherein the heating means comprises means for providing hot humid air through the workpiece to provide a rapid penetration and improved heating of the fibers and adhesive material resulting in comparatively high speed forming of the pad with a minimum forming pressure.

8 Claims, 6 Drawing Figures

FORMING APPARATUS

This is a division of application Ser. No. 313,106, filed Oct. 20, 1981, now U.S. Pat. No. 4,379,101, issued Apr. 5, 1983, which was a continuation of Ser. No. 156,437, filed June 4, 1980, now abandoned.

BACKGROUND OF THE INVENTION

1. Field of the Invention

This invention relates to the forming of fibrous workpieces each comprised of a layer of randomly disposed fibers and adhesive material dispersed throughout the fibers for binding same upon heating and compressing the fibers and adhesive material and in particular to an improved apparatus for and method of forming such workpieces.

2. Prior Art Statement

It is known in the art to provide a pad construction or pad comprised of a layer of randomly disposed fibers with adhesive material dispersed throughout the fibers and binding same upon heating and compressing the fibers and the adhesive material. However, the previous practice has been to compress the layer of fibers and adhesive material between forming surfaces of a pair of molds which are supported between the platens of a standard forming press and the heating has been provided by either heating the platens themselves utilizing known heating techniques and relying on conduction through the molds to their forming surfaces or such heating has been provided utilizing hot dry air alone or in combination with conventionally heated platens of a press.

However, in forming apparatus and methods where the heating of a workpiece is achieved by heating the platens and relying solely on heat transfer through the molds and mold forming surfaces it is necessary to heat the molds for substantial time periods and use comparatively large forming pressures resulting in increased costs. Similarly, in apparatus and methods where the heating of a workpiece is either accomplished totally by or with the aid of hot dry air the time and forming pressures are still excessive, again resulting in increased costs; and, the use of hot dry air often results in substantial charring of the workpieces resulting in losses due to scrappage.

SUMMARY

It is a feature of this invention to provide an improved apparatus for forming a fibrous workpiece comprised of a layer of randomly disposed fibers and an adhesive material dispersed throughout the fibers for binding same upon heating and compressing the fibers and adhesive material to define a unitary pad wherein such apparatus enables the forming of such pad at minimum cost due to an efficient forming action.

Another feature of this invention is to provide an apparatus of the character mentioned in which the efficient forming action is due to the utilization of hot humid air during the forming process.

Another feature of this invention is to provide an apparatus of the character mentioned comprising a press having a first and a second platen supported for movements toward and away from each other and a first and a second mold supported by the first and second platen respectively with the molds having forming surfaces which define the configuration of the pad and means for providing hot humid air through the forming surfaces and workpiece during forming.

Another feature of this invention is to provide an apparatus of the character mentioned in which the means for providing hot humid air comprises a first and a second manifold in the first and second molds respectively, a plurality of air passages communicating with each manifold and each air passage terminating in an aperture in an associated forming surface, a first conduit in flow communication with the first manifold for supplying the hot humid air to the first manifold, and a second circuit communicating with the second manifold for receiving the air after passage thereof through the manifold and workpiece.

Another feature of this invention is to provide an apparatus of the character mentioned in which the means for supplying hot humid air comprises an air blower for supplying ambient air into the first conduit at a controlled volume and pressure and means for supplying a controlled volume of superheated steam into the first conduit.

Another feature of this invention is to provide an apparatus of the character mentioned in which the means for supplying superheated steam into the first conduit comprises means supplying the steam at a pressure ranging between 2 and 10 PSIG and at a temperature ranging between 350° and 500° F.

Another feature of this invention is to provide an apparatus of the character mentioned in which the apertures in the forming surfaces are controlled in size and provide a secondary control for the amount of hot humid air flowing through the workpiece during forming.

Another feature of this invention is to provide an improved method of forming a fibrous workpiece comprised of a layer of randomly disposed fibers and an adhesive material dispersed throughout the fibers for bonding same upon heating and compressing the fibers and adhesive material to define a unitary pad.

Therefore, it is an object of this invention to provide an improved apparatus for and method of forming a fibrous workpiece of the character mentioned to define a unitary pad as specified wherein such apparatus and method have one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Figure 1:
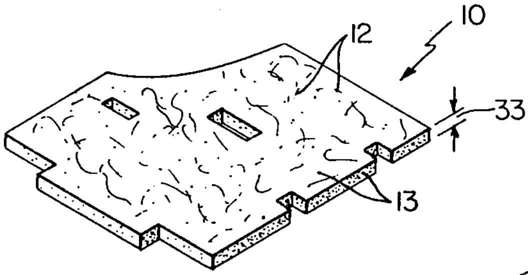
FIG. 1 is a perspective view illustrating one exemplary embodiment of a fibrous workpiece of the type which may be formed utilizing the apparatus and method of this invention to define a unitary pad.
Figure 2:
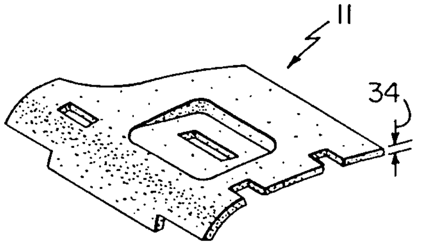
FIG. 2 is a perspective view of the completed pad defined after forming the workpiece of FIG. 1.

Reference is now made to FIG. 1 of the drawings which illustrates an exemplary fibrous workpiece which is designated generally by the reference numeral 10 and such workpiece has a special configuration such that when finally formed it defines a single-piece unitary pad which is designated generally by the reference numeral 11 in FIG. 2. The pad 11 of this example is used as a thermal and acoustical insulating pad in a door panel of an automobile.

Figure 4:
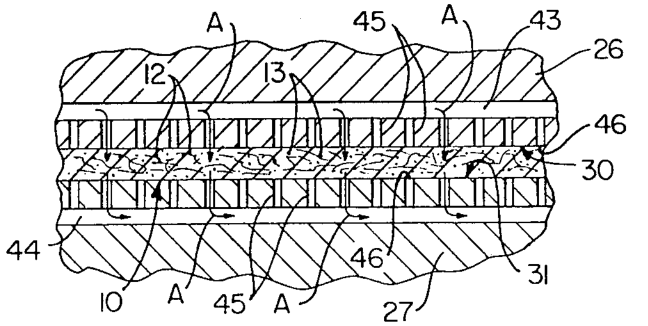
FIG. 4 is an enlarged fragmentary view taken essentially on the line 4—4 of FIG. 3.
Figure 5:
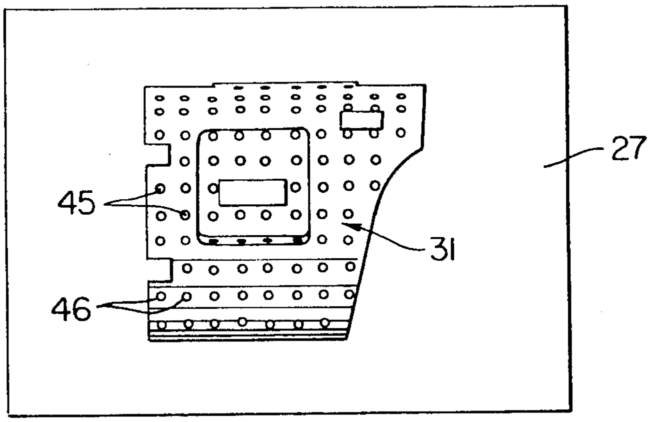
FIG. 5 is a view looking perpendicularly toward the forming surface of the lower mold of the apparatus of FIG. 3.
Figure 6:
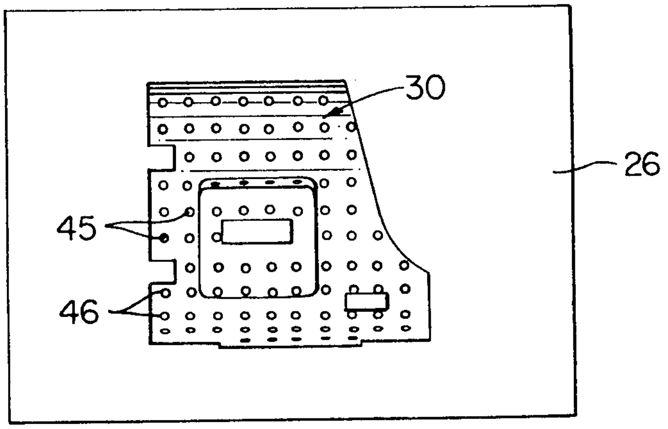
FIG. 6 is a view similar to FIG. 5 looking perpendicularly toward the forming surface of the upper mold of the apparatus of FIG. 3.

The workpiece 10 is preferably die cut from a web or blanket in a continuous manufacturing process, as is known in the art, and such workpiece is comprised of a layer of randomly disposed fibers each designated generally by the reference numeral 12 (with only a few representative ones of such fibers being so designated in FIGS. 2 and 4) and adhesive material which is shown in this example as a particulate resin, with a few typical resin particles being designated by the same reference numeral 13. The adhesive material 13 is dispersed throughout the fibers 12 for the purpose of binding same upon heating and compressing the fibers and adhesive material.

The fibers 12 may be natural fibers, synthetic fibers, or a mixture of natural and synthetic fibers; and, predominantly such fibers comprise cotton, polyester, wool, nylon, acetate, and acrylic fibers. In general, the fibers are scraps from the needle trades and/or scraps from textile mills and such fibers are randomly disposed to define a layer thereof.

The adhesive material 13 may be any suitable adhesive known in the art; however, such adhesive is preferably a dry particulate, so called high ortho type two state thermoset phenolic resin. The resin has a 20 micron average particle size. Also the amount of resin 13 used will vary depending upon the intended application, although generally the dry weight of resin used is roughly 25% to 30% of the total weight of fibers and adhesive material.

Figure 3:
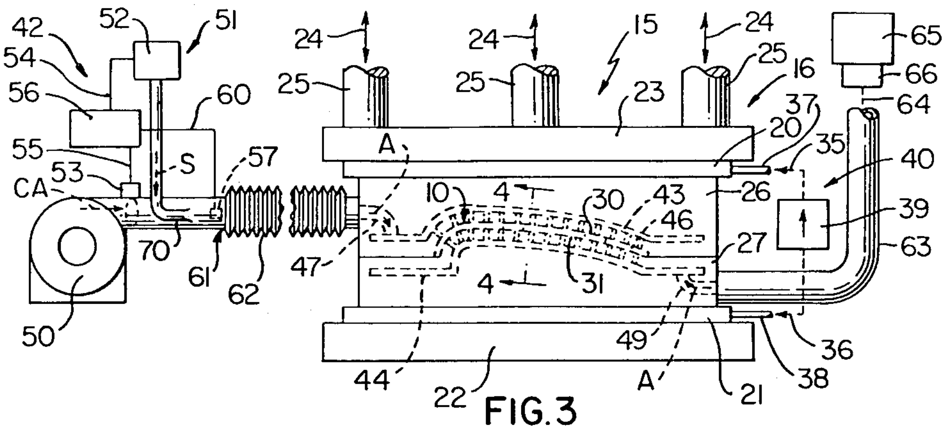
FIG. 3 is a view with parts in elevation, parts in cross section, parts shown schematically, and parts broken away illustrating one exemplary embodiment of the apparatus and method of this invention.

The workpiece 10 is preferably formed utilizing the apparatus and method of this invention which is illustrated in FIG. 3 of the drawings and designated generally by the reference numeral 15. The apparatus 15 comprises a press 16 which has a first and second platen shown as an upper and lower platen 20 and 21 respectively which are supported for relative movement toward and away from each other. In this example the lower platen 21 is stationary inasmuch as it is fixed to and carried by a stationary support 22. The upper platen 20 is fixed to and carried by an upper support 23 and such platen and support are relatively moveable toward and away from the lower platen 21 by actuating means shown as a plurality of actuators indicated schematically by double arrows 24. The actuators 24 are operatively connected to actuating members 25 which have their terminal lower ends detachably fastened to the support 23.

The press 16 has a first and a second mold shown respectively as an upper mold 28 and a lower mold 27 supported by their respective platens 20 and 21. The molds 28 and 27 have forming surfaces 30 and 31 respectively which cooperate to define the configuration of the completed pad 11 illustrated in FIG. 2 and in this embodiment of the invention the top mold is generally concave downwardly while the bottom mold is generally convex upwardly.

The apparatus 15 also has means for heating the workpiece 10 during compressing or pressure forming thereof and such heating means provides heating of the randomly disposed fibers 12 and adhesive material 13 causing the fibers 12 to be fused together in a unitary mass. During the heating and compressing of the workpiece 10 to form the completed pad the thickness of the workpiece 10 is reduced from the thickness 33 shown in FIG. 1 to the thickness 34 shown in FIG. 2. Also the amount of total force used during compressing is basically within the range capable of being exerted by a medium capacity commercial press.

The heating means for the apparatus 15 comprises means indicated schematically by an arrow 35 for heating the upper platen 20 and means indicated schematically by an arrow 36 for heating the lower platen 21. The heating means 35 and 36 comprises a suitable system, indicated schematically by a rectangular block 40, for circulating hot liquid, such as hot oil 39, through pipes 37 and 38 which are in fluid flow communication with the platens 20 and 21 respectively; and, after the hot oil is passed through the platens it is returned through associated pipes or conduits (not shown) comprising the system 40.

The means for heating the workpiece 10 also comprises means for supplying hot humid air through the workpiece and such means is indicated generally by the reference numeral 42 in FIG. 3, while the hot humid air is indicated schematically by arrows designated by the reference letter A in FIGS. 3 and 4. The hot humid air provides rapid penetration into the fibers 12 and adhesive particles 13 resulting in improved heating thereof and thereby enabling comparatively high speed forming of the pad 11 with minimum forming pressure and thus at minimum cost.

The means for providing hot humid air through the workpiece 10 comprises a first and second manifold 43 and 44 in the molds 26 and 27 respectively and a plurality of air passages each designated by the same reference numeral 45 and each communicating with an associated manifold 43 or 44. Each air passage 45 terminates in an aperture 46 in an associated forming surface, either 30 or 31. The means 42 for providing hot humid air also comprises a first conduit 47 in fluid flow communication with the manifold 43 and the conduit is used to supply hot humid air to manifold 43. The means 42 for providing hot humid air also comprises a second conduit 49 which is in fluid flow communication with the manifold 44 and receives the air A after passage thereof through the manifold 43, workpiece 10, and manifold 44. It will be appreciated that the construction and arrangement of the molds 26 and 27, forming surfaces 30 and 31, and associated parts is such that hot humid air A flows through the workpiece 10 with minimum leakage.

The means 42 for supplying hot humid air also comprises an air blower 50 for supplying ambient air CA to the conduit 47 at a controlled volume and pressure and means for supplying a controlled volume of superheated steam S into the conduit 47 with such steam supplying means being designated generally by the reference numeral 51. The means for supplying a controlled volume of superheated steam comprises a first control device shown schematically as a control valve 52 for controlling the amount of steam introduced into the conduit 47. The means 42 also comprises a second control device shown as an adjustable air valve assembly 53 for controlling the amount of ambient air introduced into the conduit 47 from the blower 50. The control valves 52 ad 53 are suitably operatively connected by lines 54 and 55 respectively to a control system 56 which is provided with appropriate feedback from a pressure, moisture, and temperature sensing device 57 which is operatively connected in an upstream portion 61 of the conduit 47.

The control system 56 provides automatic control of the valves 52 and 53 so that the air A flowing through conduit 47 and into manifold 43 has the desired volume, pressure, temperature, and humidity and this is basically achieved by controlling the amount of superheated steam S and the amount of cold ambient air CA introduced into conduit 47. The conduit 47 has a portion thereof provided as an integral part of the mold 26 and in flow communication with the manifold 43 and conduit 47 has its upstream portion 61 which is disposed outwardly of the mold 26. The upstream portion 61 has a high strength flexible duct 62 provided therein to enable movement of the upper mold 26 toward and away from the lower mold 27 during movement of the platen 20 and mold 26 for forming purposes.

The apparatus 15 has a portion of the second conduit 49 provided as an integral part of the lower mold 27 and in flow communication with the manifold 44. The conduit 40 has a portion 63 extending outwardly of the lower mold 27 and has means or a pipe 64 indicated schematically by a dot-dash line connecting the outer portion 63 of conduit 49 in flow communication with an incinerator which is indicated schematically by a rectangular block 65. Thhe incinerator 65 serves to burn the fumes generated during heating and forming of a workpiece 10 and to assure that all fumes in the vicinity of the molds 26 and 27 are removed during forming, a suction fan 66 is provided in flow communication between the pipe 64 and incinerator 65.

As previously indicated, each air passage 45 in each mold 26 and 27 terminates in an aperture 46 in an associated forming surface 30 or 31. In the direction of the flow of hot humid air, it will be appreciated that the apertures 46 in the lower mold 27 define the inlets of their associated passages 45. The aperture 46 serve as a secondary flow control means and cooperate with the means 42 to assure precise control of the amount of hot humid air introduced through the workpiece 10 during forming thereof to define the pad 11.

As previously mentioned the apparatus 15 comprises an air blower 50 and such blower may be of any suitable commercially available type. Preferably the blower 50 is capable of providing ambient air at a pressure generally of the order of 20 inches of water and at an even greater pressure.

The means for introducing superheated steam includes a nozzle 70 which is disposed in the upstream portion 61 of conduit 47 between the blower 50 and the upper mold 26. The superheated steam serves to heat the cold ambient air CA so that the air mixture of air A entering the manifold 43 is at the desired temperature and has the desired humidity or amount of water moisture. The superheated steam S may be introduced so that the superheated steam comprises between 25% and 80% of the hot humid air delivered to the workpiece being formed.

The superheated steam is preferably delivered at a low pressure ranging between 2 and 10 PSIG and at a temperature ranging between 350° F. and 500° F., depending on heat losses in expansion thereof to the lower air pressure and losses through the heating surfaces.

The apparatus and method 15 of this invention assure the forming of fibrous workpiece 10 to define the pad construction or pad 11 with optimum efficiency and at minimum cost. This optimum efficiency is made possible, in part, by a comparatively forming time, as will now be explained.

In particular, the workpiece 10 is loaded, i.e., disposed on the convex surface of the lower mold utilizing any suitable technique known in the art including manual loading or mechanical loading. Once the workpiece 10 is in position the movable upper platen 20 is moved toward the stationary lower platen 21 thereby moving the upper mold 26 and its forming surface 30 toward the lower mold 27 and its forming surface 31. During the last increment of movement (last 2 or 3 inches) of the upper mold 26 toward the lower mold 27 and until the press 16 exerts maximum molding or forming pressure, the ambient air CA provided by the blower 50 is supplied through conduit 47 at high volume while the superheated steam S is supplied at a comparatively low volume and this is continued for a time increment generally of the order of 3 seconds. This portion of the forming cycle helps to establish air flow through the workpiece 10.

Following this initial 3 second time interval the volume of cold air CA is reduced and the superheated steam volume is increased to a predetermined value for each so as to establish the desired volume, temperature, pressure, and humidity of air A as set on the control system 56. The air A thus established and having the properties mentioned is maintained with the press at maximum holding pressure for a time generally of the order of 10 seconds.

At the completion of this 10 second interval the superheated steam is turned off and cold air CA from blower 50 is again provided at maximum volume to urge water vapor from within the manifolds 43 and 44 and passages 45 of the molds. This cold ambient air is provided for a time period of roughly 3 seconds and also serves to produce a small amount of cooling which helps in ejecting the completed pad 11 from within the top downwardly concave mold cavity. At the completion of this 3 second portion of the cycle the cold air CA is turned off by shutting off the blower 50.

At this point in the cycle, the platen 20 is moved away from the platen 21 thereby opening the press and enabling the completed pad 11 to be removed. A new workpiece 10 which is to be formed is then placed on the lower mold 27 and the forming cycle repeated as described before.

The apparatus and method 15 of this invention utilize the dual heating action of conduction provided through molds 26 and 27, to form each workpiece 10, cooperating with heating provided by moist hot air A results in a highly efficient forming. Further, the completed pad 11 has great strength and structural integrity.

As will be readily apparent from the above description the entire forming cycle is achieved in about 16 seconds (exclusive of loading and unloading) and this is generally of the order of several times faster than previously proposed forming cycles. In addition the forming action is achieved substantially without damage to the workpiece.

Various terms such as "upper," "lower," and the like have been used throughout this disclosure of the invention. However, it is to be understood that these terms have been used for ease of description and presentation and are not to be considered as limiting in any way.

It will also be noted that supports for portions of the apparatus, power sources, controls for the power sources, and the like have not been illustrated and described herein; however, it is to be understood that these items may be of any suitable type known in the art.

While present exemplary embodiments of this invention, and methods of practicing the same, have been illustrated and described, it will be recognized that this invention may be otherwise variously embodied and practiced within the scope of the following claims.

What is claimed is:

1. In an apparatus for forming a fibrous workpiece comprised of a layer of randomly disposed fibers and an adhesive material dispersed throughout said fibers for binding same upon heating and compressing said fibers and adhesive material to define a unitary pad; said apparatus comprising; a press having a first and a second platen supported for relative movement toward and away from each other; a first and a second mold supported by said first and second platens respectively; said molds having forming surfaces which define the configuration of said pad; and means for heating said workpiece; the improvement in which said heating means comprises, means for mixing ambient air and superheated steam comprising a control system which controls a control device for said steam and a control device for said ambient air to thereby provide hot humid air, said control device for said ambient air being adapted to operate independently of said control device for said steam, and means for providing said hot humid air through said workpiece to provide a rapid penetration by said hot humid air and improved heating of said fibers and adhesive material enabling comparatively high speed forming of said pad with a minimum forming pressure, said means for providing hot humid air through said workpiece comprising, a first and second air manifold in said first and second molds respectively, a plurality of air passages communicating with an associated manifold and each air passage terminating in an aperture in an associated forming surface, a first conduit in flow communication with said first manifold for supplying said hot humid air to said first manifold, and a second conduit communicating with said second manifold for receiving said air after passage thereof through said manifolds and workpiece, an air blower for supplying ambient air into said first conduit at a controlled volume and pressure, and means for supplying a controlled volume of superheated steam into said first conduit, said control device being adapted to purge said manifolds and said passages of water vapor and to cool said workpiece after said hot humid air has been provided through said workpiece.

2. An apparatus as set forth in claim 1 in which said means for supplying a controlled volume of superheated steam into said first conduit comprises means supplying said steam at a pressure ranging between 2 and 10 PSIG and at a temperature ranging between 350° F. and 500° F.

3. An apparatus as set forth in claim 2 in which said means for supplying a controlled volume of superheated steam comprises a first control device for controlling the amount of said steam introduced into said first conduit, and said apparatus further comprises a second control device for controlling the amount of said ambient air introduced into said first conduit and a control system for said control devices, said control devices being operatively connected to said control system which controls the amount of said ambient air and stream so that said steam comprises between 25% and 80% of said hot humid air.

4. An apparatus as set forth in claim 3 and further comprising, a pipe connecting said second conduit in flow communication with an incinerator to enable incineration of the fumes generated during heating and forming of said workpiece, and a suction fan operatively connected between said pipe and incinerator for evacuating said fumes from the vicinity of said molds.

5. An apparatus as set forth in claim 1 in which said apertures in each of said forming surface have the same effective diameter which ranges between ⅛ inch and 3/16 inch.

6. An apparatus as set forth in claim 1 in which said apertures in each forming surface are disposed in a symmetric pattern having between 40 and 100 apertures per square foot.

7. An apparatus as set forth in claim 6 in which said molds are made of metal and said apertures in each of said forming surfaces have the same effective diameter which ranges between ⅛ inch and 3/16 inch.

8. An apparatus as set forth in claim 1 in which said air blower is capable of providing ambient air at a pressure of at least 20 inches of water.

* * * * *